(12) United States Patent
Plönnigs et al.

(10) Patent No.: US 11,813,126 B2
(45) Date of Patent: Nov. 14, 2023

(54) METHOD FOR PROVIDING A DENTAL PROSTHESIS AND A POSITIONING GUIDE FOR PLACING THE DENTAL PROSTHESIS

(71) Applicant: 3SHAPE A/S, Copenhagen (DK)

(72) Inventors: Birk Plönnigs, Copenhagen (DK); Rune Fisker, Virum (DK)

(73) Assignee: 3SHAPE A/S, Copenhagen K (DK)

( * ) Notice: Subject to any disclaimer, the term of this patent is extended or adjusted under 35 U.S.C. 154(b) by 1197 days.

(21) Appl. No.: 16/414,904

(22) Filed: May 17, 2019

(65) Prior Publication Data
US 2019/0350675 A1 Nov. 21, 2019

(30) Foreign Application Priority Data

May 18, 2018 (EP) ..................... 18173353
Jun. 1, 2018 (EP) ..................... 18175522

(51) Int. Cl.
| | |
|---|---|
| *A61C 1/08* | (2006.01) |
| *B33Y 50/02* | (2015.01) |
| *B33Y 80/00* | (2015.01) |
| *B29C 64/393* | (2017.01) |
| *A61C 8/00* | (2006.01) |
| *A61C 9/00* | (2006.01) |
| *B23C 3/16* | (2006.01) |
| *B33Y 10/00* | (2015.01) |
| *B29L 31/00* | (2006.01) |

(52) U.S. Cl.
CPC ............ *A61C 1/084* (2013.01); *A61C 8/00* (2013.01); *A61C 9/004* (2013.01); *B23C 3/16* (2013.01); *B29C 64/393* (2017.08); *B33Y 50/02* (2014.12); *B33Y 80/00* (2014.12); *B29L 2031/7532* (2013.01); *B33Y 10/00* (2014.12)

(58) Field of Classification Search
None
See application file for complete search history.

(56) References Cited

U.S. PATENT DOCUMENTS

| | | | |
|---|---|---|---|
| 2005/0084822 A1* | 4/2005 | Stucki-McCormick | ..................... A61C 8/0006 433/173 |
| 2005/0089822 A1* | 4/2005 | Geng | ..................... G16Z 99/00 433/167 |
| 2009/0263764 A1* | 10/2009 | Berckmans, III | ..... A61C 9/0006 433/215 |
| 2011/0060558 A1* | 3/2011 | Pettersson | .............. A61C 1/084 703/1 |
| 2012/0015316 A1* | 1/2012 | Sachdeva | ............... G16H 40/20 382/128 |
| 2014/0272772 A1* | 9/2014 | Andreiko | ............... A61C 7/002 433/29 |

(Continued)

FOREIGN PATENT DOCUMENTS

| | | | | |
|---|---|---|---|---|
| DE | WO 2011062951 A1 * | 5/2011 | .......... | A61C 8/0083 |
| EP | 2322115 A1 | 5/2011 | | |

(Continued)

*Primary Examiner* — Charles E Anya
(74) *Attorney, Agent, or Firm* — BUCHANAN INGERSOLL & ROONEY PC

(57) ABSTRACT

A method for designing a dental prosthesis and a positioning guide for placing the dental prosthesis on implants in the jaw while maintaining proper occlusion relates to designing the dental prosthesis and the positioning guide prior to implant placement.

14 Claims, 2 Drawing Sheets

(56) References Cited

U.S. PATENT DOCUMENTS

| | | | |
|---|---|---|---|
| 2015/0025855 A1* | 1/2015 | Fisker | A61C 9/004 |
| | | | 703/1 |
| 2016/0278878 A1* | 9/2016 | Watson | A61C 13/01 |
| 2017/0112592 A1* | 4/2017 | Groscurth | A61C 1/084 |
| 2017/0202650 A1* | 7/2017 | Böhm | A61C 13/0018 |
| 2018/0206949 A1* | 7/2018 | Jordan | G06T 19/20 |

FOREIGN PATENT DOCUMENTS

| | | | | |
|---|---|---|---|---|
| JP | WO 2012004937 A1 * | 11/2006 | | A61C 13/0004 |
| JP | WO 2011102118 A1 * | 8/2011 | | G01B 9/02091 |
| WO | WO 9319689 A1 * | 10/1993 | | A61C 13/0004 |
| WO | WO 2011062951 A1 * | 5/2011 | | A61C 13/00 |
| WO | 2014016378 A1 | 1/2014 | | |
| WO | WO 2015178616 A1 * | 5/2015 | | A61C 19/04 |
| WO | 2017019289 A2 | 2/2017 | | |

\* cited by examiner

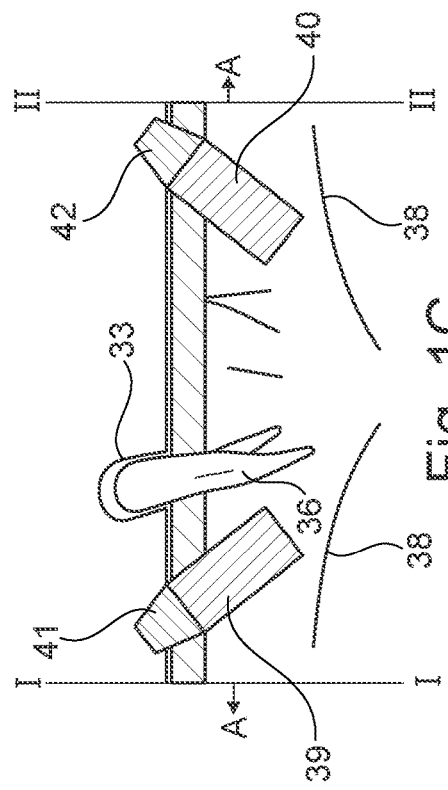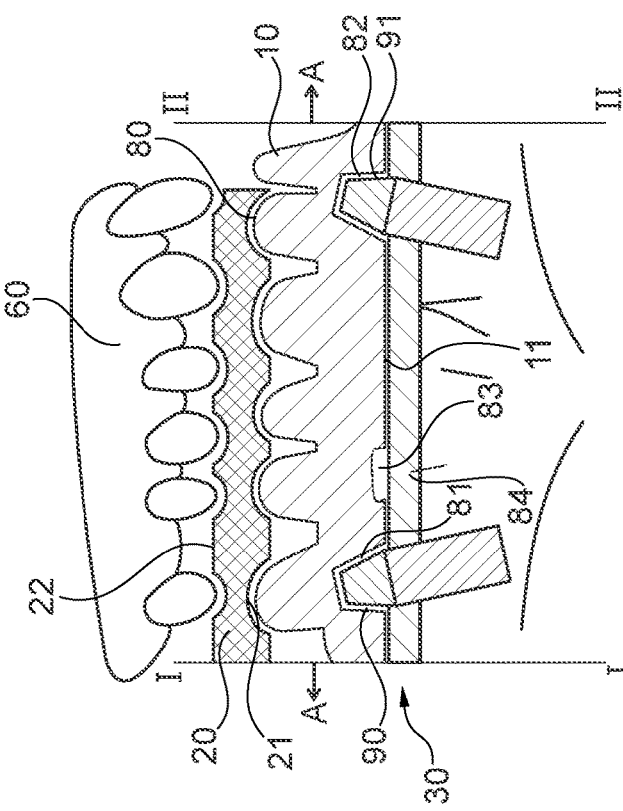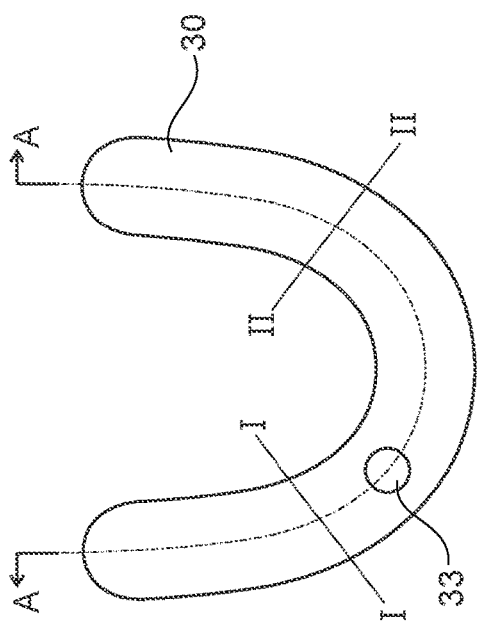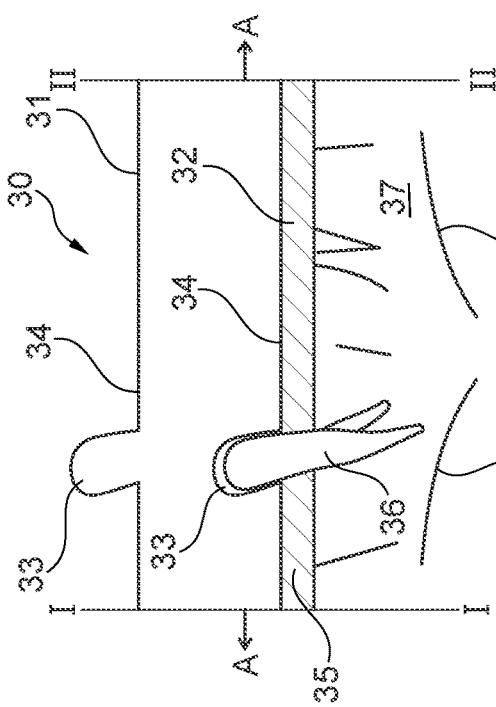

ized so that the prosthesis can be placed without the need of a positioning guide to maintain the proper occlusion between the prosthesis and the opposing dental situation (e.g. antagonist teeth) then the digital prosthesis design or a prosthesis manufactured therefrom does not fall within the disclosure herein. However, if the step of creating the shape of the abutment hole at least partly on an enlarged shape of the digital abutment representation provides a digital prosthesis design or a prosthesis manufactured therefrom with an abutment hole which necessitates the need of a positioning guide in order to place the prosthesis in proper occlusion then the digital prosthesis design or a prosthesis manufactured therefrom falls within the disclosure herein.

METHOD FOR PROVIDING A DENTAL PROSTHESIS AND A POSITIONING GUIDE FOR PLACING THE DENTAL PROSTHESIS

TECHNICAL FIELD

Disclosed herein is method for designing a dental prosthesis and a positioning guide for placing the dental prosthesis on implants in the jaw while maintain proper occlusion. In particular the method relates to a method for designing the dental prosthesis and the positioning guide prior to implant placement. Accordingly, the disclosure relates to a method and a kit of components suited for one-day implant surgery thereby reducing the time the patient spend in the dentist chair.

BACKGROUND

So-called one-day implant surgery are becoming popular and common with dental implantologists and even for more general dental practitioners.

The advantage of getting everything done in one day is of course time saving, especially for the patient who do not have to go back for several appointments spread over several days. Even further, where it has been common to let the implants heal and settle for a period after placement more practitioners are starting to apply an immediate load practice. This is based on the experience that if you load the implants immediately after placement the risk of implant rejection and bone regression seems to be reduced.

Accordingly, there is an interest in even further facilitate such one-day implant surgeries.

As disclosed herein it will for example be understood that there is a need for a prosthesis, temporary or permanent, that can be placed on the implants immediately after surgery. This requires that the prosthesis is created before surgery and therefore needs to take into account possible deviations in implant placement that may occur during implant placement, e.g. when drilling the bore.

Even further there is also a desire to ensure that the proper occlusion between the prosthesis in one jaw and the teeth in other jaw (natural or artificial) is maintained. Lack of proper occlusion often leads to discomfort or even pain for the patient. This is also addressed by the following disclosure.

SUMMARY

In one aspect herein there is disclosed a method of creating a digital prosthesis design of a prosthesis, which when manufactured can be placed on at least one implant placed in a first jaw of a patient and creating a digital guide design of a positioning guide, which when manufactured can be used to position the prosthesis on the at least one implant so that the manufactured prosthesis is in a desired occlusal contact with a dental anatomy of a second jaw opposite the first jaw, wherein the method comprising steps of, obtaining a digital first jaw model comprising a surface representation of at least a part of the first jaw and of an at least one expected implant site comprising a digital abutment representation of an abutment arranged at the at least one expected implant site, creating the digital prosthesis design comprising a distal prosthesis surface and a proximal prosthesis surface wherein the proximal prosthesis surface comprises at least one abutment hole, and creating the shape of the abutment hole larger than the digital abutment representation, obtaining a digital second jaw model of the second jaw comprising a surface representation of at least a part of the second jaw opposing the at least one expected implant site, and creating a digital guide design of the positioning guide comprising a distal guide surface which at least partly comprises a shape corresponding to the shape of a part of the digital second jaw model and a proximal guide surface which at least partly comprises a shape corresponding to the shape of a part of the distal prosthesis surface.

One effect of providing abutments holes in the digital prosthesis design that is larger than the digital abutment representation is that the manufactured prosthesis can be placed even if the at least one implants has moved a little from its respective expected implant site.

Creating the shape of the abutment hole larger than the digital abutment representation can for example be done by creating the shape of the abutment hole at least partly on an enlarged shape of the digital abutment representation. In another embodiment creating the shape of the abutment hole can for example be done based fully or partly on a simple geometrical shape which is larger than the digital abutment representation. Such geometrical shape can for example be hexagonal, rectangular or cylindrical, or another volume which will cover the abutment when the prosthesis is manufactured.

Accordingly, this solves the problem of facilitating placement of the prosthesis.

However, by providing such enlarged abutment holes there is also an increased risk that the manufactured prosthesis may be placed so that a bad bite occurs. In other words, the jaws will end in incorrect occlusion when biting together.

Accordingly, the effect of providing using a positioning guide manufactured based on the digital guide design as disclosed ensure proper positioning of the prosthesis on the at least one implant and thus solves the problem of providing proper occlusion.

Although discussed later in the disclosure it is difficult to strictly quantify the size and shape of the abutment hole, e.g. by the enlarged shape of the digital abutment representation, e.g. that it should have a specific numerical offset. In general it will be the experience of the practitioner or designer that determine the specific enlarged shape, which will for example be affected by the number of implants and abutment, the abutment types, material type etc. Accordingly the meaning of the step of creating the shape of the abutment hole at least partly on an enlarged shape of the digital abutment representation, should be understood in relation to the need of providing a positioning guide in order to maintain the proper occlusion of the prosthesis during placement on the at least one implant. Thus, if the abutment hole is sized so that the prosthesis can be placed without the need of a positioning guide to maintain the proper occlusion between the prosthesis and the opposing dental situation (e.g. antagonist teeth) then the digital prosthesis design or a prosthesis manufactured therefrom does not fall within the disclosure herein. However, if the step of creating the shape of the abutment hole at least partly on an enlarged shape of the digital abutment representation provides a digital prosthesis design or a prosthesis manufactured therefrom with an abutment hole which necessitates the need of a positioning guide in order to place the prosthesis in proper occlusion then the digital prosthesis design or a prosthesis manufactured therefrom falls within the disclosure herein.

The step of creating the shape of the abutment hole at least partly on an enlarged shape of the digital abutment representation should be construed broadly as there are many options of doing this in a digital design environment. E.g. a person used to work in CAD software environment having the appropriate models would easily do this and equivalents thereof when given and described the step of doing so. For example, the shape of the abutment hole could initially be shaped to fit the digital abutment representation and then enlarged, e.g. by offsetting. The desired effect of this feature is to create a prosthesis based on the digital prosthesis design which have an abutment hole that give some play in moving the prosthesis in a direction transverse to the insertion direction (direction which the prosthesis is placed onto the implant and abutment) when the prosthesis is placed on the abutment (and the prosthesis is not fixed to the occlusion using the positioning guide).

The method disclosed may advantageously be performed in a digital design environment such as CAD design software. In particular the method could be provided in a dental specific CAD software, such as the 3Shape Dental System. Accordingly, the method can be run on software that can be executed on a computed device such as a well known desktop computer comprising physical or cloud storage for storing the software, a processor for executing the software, a monitor for presenting the digital design environment to the user and a mouse and a keyboard or similar input device in order for the user to interact with the digital design environment presented on the monitor.

In one embodiment the method comprises the step of obtaining a digital first jaw model further comprises the steps of,
   obtaining a surface scan of the expected implant site,
   obtaining a radiographic image of the expected implant site, and
   arranging the surface scan and the radiographic image in a common coordinate system.

This advantageously provides a digital first jaw model that provides surface scan which often is of high resolution and therefore is suitable to use as a basis for designing the prosthesis. Such surface scans can for example be obtained by scanners well known in the art such as intra oral scanner, for example the TRIOS scanner, which uses optical scanning means to obtain a 3D surface scan.

However, the surface scan cannot detect structure below the surface of the jaw. Accordingly, if the dentist wants to do implant planning it is an advantage to be able to consider structures such as bone density, teeth roots, nerves etc. However, radiographic images often have a rough resolution since a higher resolution typically requires a higher radiation dose, which is not recommended. A typical radiographic image that is used in dentistry is a CBCT (cone beam computed tomography) image that provides a 3D radiographic image.

Thus, by combining the two a digital first jaw model is provided which is suitable for designing a prosthesis and for implant planning.

Furthermore, in order to properly plan and design the surface scan and radiographic image is arranged in one coordinate system so that identical features in the surface scan and radiographic image are placed at the same coordinates.

In some cases the implant may already have been placed and an abutment has already been placed in the implant. In such cases the digital abutment representation represents the position of an already placed implant and abutment. However, it may still be relevant to use the method disclosed herein since the digital first jaw model may not be completely accurate or the implant may risk shifting a little before the prosthesis has been manufactured.

In another embodiment the method further comprises that the digital abutment representation is a digital abutment model.

A digital abutment model is a CAD model which is a digital representation of an abutment that the user anticipates using in the placed implant. Abutment are generally known in the art and can be understood as an interface element between the implant wherein it is placed and the prosthesis which is placed on the abutment. Abutments comes in many types and some by be of the shelf standard abutments whereas others are customized to fit the specific implant in a specific oral situation.

The abutment(s) could for example be one or more of the following type of abutments, Ti-base abutments, customized abutments, stock abutments, multiunit abutments, temporary abutments/cylinders, abutment locators, healing caps, hybrid abutment, straight/angled abutments, single/two-piece abutments and/or cement/screw-retained abutments.

For example, in embodiments, wherein the method further comprises the step of selecting the digital abutment model from a digital abutment model library the user is allowed to chose between a number of digital abutment models for use in the method as disclosed.

This provides the user to try different abutment types on the digital first jaw model and get an understanding of which abutment seems best suited for a specific case.

In an even further embodiment the method further comprises the step of,
   providing a digital implant model,
   arranging the digital implant model at the expected implant site,
   arranging the digital abutment model with the digital implant model.

Accordingly, the user is not only able to test digital abutment models, it is also possible to plan proper implant placement by arranging the digital implant model at the expected implant site or even test different positions before deciding on one specific.

Moreover, the digital abutment model and the digital implant model may be paired together so that the software automatically places them in a proper relative arrangement, which corresponds to the arrangement that will be created when the corresponding respective physical implant and abutment is placed in the first jaw.

In order to keep the manufactured prosthesis and positioning guide together during placement a friction fit or a detachable assembly, such as a weak gluing, can be provided so that when the prosthesis have been placed and it have been fixed to the abutment, e.g. by gluing, the prosthesis and positioning guide can be separated.

However, in one embodiment, the step of creating the digital prosthesis design further comprises the step of,
   designing a support structure on the digital prosthesis design, wherein the support structure is designed to contact at least a part of the surface representation of the first jaw, for example by extending the support structure proximally from the digital prosthesis design.

This ensures that when the prosthesis is arranged in the mouth and the patient bites down the prosthesis will not detach from the positioning guide since the support structure has the effect the prosthesis is pressed into the positioning guide and held in place.

The method disclosed herein is particularly suited for designing dentures. Accordingly, in one embodiment the step of creating the digital prosthesis design comprises the step of, creating a digital gingiva model of the prosthesis, and creating at least one tooth model of the prosthesis extending distally from the digital gingiva model.

However, the person skilled in the art will understand that other types of dental prostheses may be designed using the disclosed method.

The enlarged shape of the abutment hole relative to the digital abutment representation can be provided in different ways.

In one embodiment this can be provided by the method wherein the step of creating the shape of the abutment hole comprises the step of, offsetting the digital abutment representation outwards.

Advantageously such an offset is more than 0.5 millimetres, for example between 0.5 and 1.5 millimetres. This provides for sufficient space to accommodate most changes in implant placement, however, a higher offset may be desired relative to the number of implants used to fix the prosthesis.

And in an even further embodiment the step of creating the shape of the abutment hole comprises the step of, removing undercuts comprising reducing the digital prosthesis design so that an overlap between the digital prosthesis design and the digital abutment representation is removed when relatively shifting the prosthesis design and the surface representation of at least a part of the first jaw along a desired insertion direction between a position where the digital abutment representation is outside the abutment hole and a position where at least a part of the prosthesis surface and the surface representation of at least a part of the first jaw align with each other.

As can be understood removing undercuts ensures that the prosthesis may be correctly placed from at least one insertion direction.

In another aspect there is disclosed a method of manufacturing a prosthesis and a placement guide for placing the temporary prosthesis in a desired position in the oral cavity comprising the steps of, creating a digital prosthesis design of the temporary prosthesis as disclosed herein, creating a digital guide design of the positioning guide as disclosed herein, manufacturing the prosthesis based on the digital prosthesis design using a 3D manufacturing process, and manufacturing the positioning guide based on the digital guide design using a 3D manufacturing process.

Such 3D manufacturing process can for example be 3D printing and/or 3D milling. Both are well known 3D manufacturing processes.

In an even further aspect there is disclosed a kit comprising a prosthesis for placing on at least one implant placed in a first jaw of a patient and a positioning guide for positioning the prosthesis on the at least one implant so that the prosthesis is in a desired occlusal contact with a dental anatomy of a second jaw opposite the first jaw.

By providing such a kit the practitioner can easily proceed with placing the prosthesis.

In such a kit the prosthesis and the positioning guide can be manufactured as disclosed previously by 3D manufacturing. This enables the dentist to obtain the kit the same day as the planning and thus ensuring a one-day treatment as discussed.

Even further the kit may comprise a drill guide adapted for guiding a dental drill for drilling at least one bore in the first jaw for placing the at least one implant.

This provides a kit with three parts which facilitates a one-day treatment.

In yet another aspect the prosthesis manufactured based on the digital prosthesis design and the positioning guide manufactured based on the digital guide design is used together with a method and/or a system for navigated implant surgery. This can for example be the X-Guide™ system from X-NAV Technologies which provides dynamic 3D navigation that delivers guidance for providing a bore implant with accurate position, angle and depth for implant placement.

BRIEF DESCRIPTION OF THE DRAWINGS

The above and/or additional objects, features and advantages of the present invention, will be further described by the following illustrative and non-limiting detailed description of embodiments of the present invention, with reference to the appended drawing(s), wherein:

FIG. 1A-1D shows one embodiment of a method as disclosed herein for creating a digital prosthesis design and a digital guide design.

DETAILED DESCRIPTION

Figure 2A:
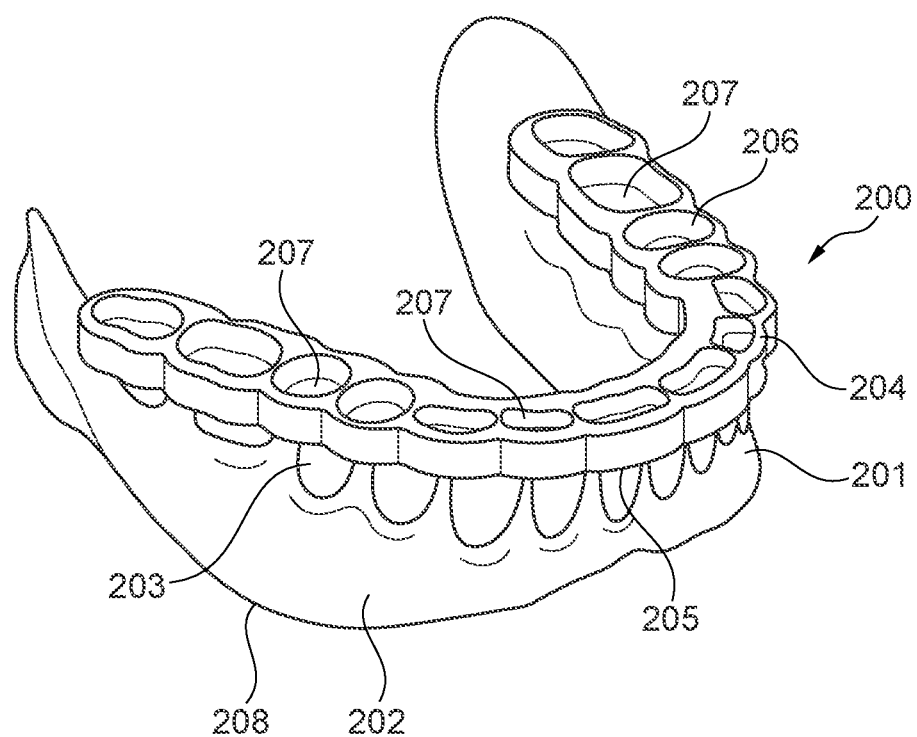
FIGS. 2A and 2B shows another embodiment of a digital prosthesis design and a digital guide design and also shows a digital drill guide design used together with the above.

In the following description, reference is made to the accompanying figures, which show by way of illustration how the invention may be practiced.

An embodiment of the method disclosed herein is shown in FIGS. 1A-1D, wherein it is shown how a digital prosthesis design 10 and a digital guide design 20 is created.

Initially a digital first jaw model 30 is obtained. The digital first jaw model is a representation of the mandible (lower jaw), however the method disclosed herein could just as well be applied to an embodiment where the digital first model is a representation of the maxilla (upper jaw). In FIG. 1A the digital model is seen from an occlusal view.

In FIG. 1B the digital first jaw model 30 is seen in a cross section along the line A-A in FIG. 1A between longitudinal sections I-I and II-II. As can be seen the digital first jaw model 30 is formed by a surface scan 31 and a CBCT scan 32 of the oral situation. The digital first jaw model may comprise other representations of the oral situation as well. For illustrative purposes the surface scan 31 and the CBCT scan 32 of the first jaw are shown slightly offset, however, these will typically be aligned together so that they are represented in correct position relative to each other in a common coordinate system.

The surface scan 31 can advantageously be obtained directly by an intra oral scanner, such as the TRIOS scanner sold by 3Shape TRIOS. However, it may also be obtained by scanning a dental impression or a gypsum model of the first jaw. Surface data can be stored in a so-called STL or similar file format which is read into the system and processed in order to visualize the first jaw. The CBCT scan 32 of the first jaw can be obtained by conventional CBCT (Cone Beam Compute Tomography) scanner on the market. CBCT data can be stored in a so-called DICOM file format which is read into the system and processed in order to visualize the first jaw.

The advantage of using a surface scan 31 in combination with a CBCT scan 32 is that a surface scan typically has a higher resolution than a CBCT scan. Thus, a surface scan 31 can be advantageous to use as a base for designing prostheses, surgical drill guides and other dental appliance, whereas the CBCT scan provides sub surface information which is important when planning for invasive procedures such as implant placement.

The digital first jaw model 30 thus forms a representation of the jaw of the scanned person which in the current embodiment shows among other numerous dental features such as a single tooth 33, gum surface 34, gum thickness 35, sub-surface tooth structures such as a tooth root 36 of the tooth 33, jaw bone 37 and the mandibular nerve 38.

Based on the established digital first jaw model 30 a user can proceed to do implant planning as shown in FIG. 1C. In the current embodiment the user proceeds with planning for two implants taking into consideration one or more dental features such as the mandibular nerve 38, density of the jaw bone 37, teeth roots etc. The user is using digital implant models 39, 40 which represents implants that he anticipates using during implant placement and places them accordingly. Such digital implant models are preferably CAD models which can be used in respective CAD software and manipulate with in a digital design environment.

The user will also choose suitable abutments, similarly represented by digital abutment models 41, 42, and arrange them in the corresponding digital implant models. Similarly as above the digital abutment models are preferably CAD models which can be used in respective CAD software and manipulate with in a digital design environment.

When the user is satisfied with the implant planning he can then proceed to design the digital prosthesis design 10 and the digital guide design as shown in FIG. 1D. In order to do this, the user will obtain a digital second jaw model 60, which in the current example is the maxilla (upper jaw). However, it could also be a digital model of an opposing prosthesis, such as a designed denture or a scan of an existing denture. Furthermore, the digital second jaw model 60 is in the current embodiment only a surface scan provided by an intra oral scanning process. However, as disclosed above such a surface scan can be provided by other means, such as scanning an impression or a gypsum model.

Similar to what was discussed in relation to the digital first jaw model the digital second jaw model could also be a representation of the mandible when the digital first jaw model is a representation of the maxilla.

The user can then proceed to create the digital prosthesis design 10 based on the digital first jaw model 30 and the digital second jaw model 60. The digital prosthesis design 10 is in the current example processed as a solid CAD model. This means the in the digital design environment the digital prosthesis design 10 is handled as an object with a thickness and a watertight mesh defining the full shape of the CAD model. The digital prosthesis design is formed by a distal prosthesis surface 80, which is the surface facing the digital second jaw model 60, and a proximal prosthesis surface 11, which is the surface facing the digital first jaw model 30. In other words, the distal prosthesis surface 80 can in general be considered to be defined by the virtual teeth and virtual gingiva anatomy surface, which includes the occlusal surface that will be in contact with the surface of the digital second jaw model 60 when evaluating occlusion, for example by using a virtual articulator. The proximal prosthesis surface 11 can generally be considered the surface of the manufactured prosthesis which when placed on the implants face the gingiva of the first jaw.

The proximal prosthesis surface 11 is designed primarily based on the surface scan 31 and the planned placement of the implants represented by the digital implant models 39, 40 and the abutments represented by the digital implant models 41, 42 and can comprise the following steps:
 a) Generate a digital intermediate proximal surface (not shown) of the digital prosthesis design 10 by duplicating a defined part the surface scan 31,
 b) Subtract the implant models and the abutment models from the CAD model of the digital prosthesis design 10 using a Boolean subtraction. Since the model of the temporary prosthesis 10 is considered a solid CAD model, intermediate abutment holes can be provided by performing a Boolean subtraction,
 c) Generate the abutment holes 90,91 by offsetting the intermediate abutment holes to provide a gap 81, 82 between the abutment holes and the models of the implants and the abutment, and
 d) Remove undercuts by modifying the digital prosthesis design so that it can freely be moved relative to the digital first jaw model and the abutment models along at least one linear movement (insertion direction) between a position where the abutment models can be received in the abutment holes and a position where they are outside the abutment holes without the digital prosthesis design and the digital first jaw model overlapping or otherwise conflicts.

By expanding the abutment holes 90, 91 as described above, in particular in step c) and d) tolerances can be taken into consideration when planning for the implant placement. Such tolerances can for example be surgical tolerances such as the drill not engaging the jaw bone in the exact position desired or scanner tolerances where the accuracy needed exceeds the accuracy of the digital first jaw model.

In addition the user is planning to extract the tooth 33. In order to make room for healing and avoid pressure in that area a recess 83 is designed in the proximal prosthesis surface 11 opposite the planned extraction site 84 of the digital first jaw model 30.

The distal prosthesis surface 80 can be generated by designing an anatomy of the prosthesis as described in the art so that the occlusive surface thereof ensure proper occlusion against antagonist teeth of the digital second jaw model 60.

With the digital prosthesis design 10 properly created the digital guide design 20 can subsequently be generated.

The digital guide design 20 is formed with a proximal guide surface 21 which at least in part comprises the complementary shape of the distal prosthesis surface 80. This can for example be provide by a Boolean subtraction of the digital prosthesis design 10 from the digital guide design 20.

Similarly, the digital guide design is formed with a distal guide surface 22 that is generated by a Boolean subtraction of the digital second jaw model 60 from the digital guide design 20.

Accordingly, seeing that the abutment holes 90, 91 are oversized there is a risk that a prosthesis manufactured based on the digital prosthesis design is placed incorrectly if not guided properly. Accordingly, by using a positioning guide manufactured based on the digital guide design the position of the prosthesis is ensured even if the implants was not placed exactly as planned, thereby ensuring the desired occlusion between the prosthesis and the opposing jaw.

FIG. 2A shows a digital kit 200 comprising a digital prosthesis design 201 in the form of a digital denture comprising a digital gingiva model 202 having digital teeth models 203 provided on the distal surface of the digital gingiva model and a digital guide design 204. The digital kit 200 may be manufactured using conventional 3D manufacturing techniques. Accordingly the kit can be provided to a user in digital form whereby they can produce the kit part themselves or the kit can be shipped in physical form ready to be used by the practitioner.

A digital guide design 204 is arranged on the digital teeth model. Although not shown the proximal surface 205 of the digital guide model comprises proximal recesses for receiving at least a part of the digital teeth models 203.

The distal surface 206 of the digital guide design comprises distal recesses 207. The distal recesses 207 are designed based on the opposing dental situation (not shown). In the current embodiment the opposing dental situation is formed of antagonist teeth (not shown). The scan of the opposing dental situation is then used to generate the distal recesses 207. This can for example be done by a Boolean subtraction which a person skilled in the art would be able to perform. Alternatively, these recesses could also be provided based on the digital artificial teeth of an opposing denture.

Although not shown the proximal surface 208 of digital prosthesis design 201 is formed with two abutment holes (not shown) slightly oversized in order to accommodate for possible implant movement that could have occurred during implant placement so that the prosthesis manufactured based on the digital prosthesis design 201 can be properly placed on the abutments (not shown.

Figure 2B:
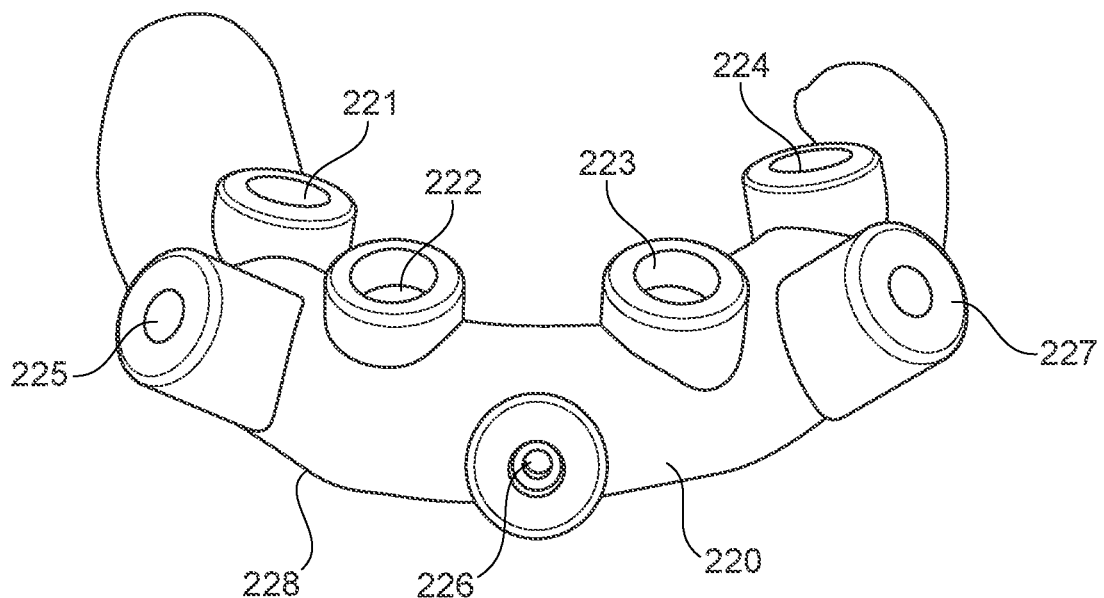

In addition, the digital kit 200 can also include a digital drill guide design 220 as shown in FIG. 2B. The digital drill guide design 220 comprises four drill guide bores 221,222, 223,224. When manufactured the drill guide bores are used to guide a drill into the jaw bone in order to create implant bores in the jawbone wherein the implants (not shown) for supporting the prosthesis (manufactured based on the digital prosthesis design 201) when arranged on the jaw of patient.

The digital drill guide design 220 is also formed with anchor bores 225,226,227 which is used for establishing bone anchors, which are screws that secures the drill guide to jaw bone during implant bore drilling.

The proximal surface 228 of the digital drill guide design 220 is designed based on a scan of the gum surface of an edentulous patient in which the prosthesis manufactured from the digital prosthesis design 201 is to be placed.

The invention claimed is:

1. A method of creating a digital prosthesis design of a denture, which when manufactured can be placed on at least one implant placed in a first jaw of a patient, and creating a digital guide design of a positioning guide configured to maintain proper occlusion between the denture and the opposing jaw during placement of the denture on the at least one implant, which when manufactured can be used to position the denture on the at least one implant, wherein the manufactured denture is in a desired occlusal contact with a dental anatomy of a second jaw opposite the first jaw, the method comprising:
obtaining a digital first jaw model comprising a surface representation of at least a part of the first jaw and of an at least one expected implant site comprising a digital abutment representation of an abutment arranged at the at least one expected implant site,
creating the digital prosthesis design comprising a distal prosthesis surface and a proximal prosthesis surface, wherein the proximal prosthesis surface comprises at least one abutment hole and creating a shape of the abutment hole larger than the digital abutment representation,
obtaining a digital second jaw model of the second jaw comprising a surface representation of at least a part of the second jaw opposing the at least one expected implant site, and
creating the digital guide design of the positioning guide comprising a distal guide surface which at least partly comprises a shape corresponding to the shape of a part of the digital second jaw model and a proximal guide surface which at least partly comprises a shape corresponding to the shape of a part of the distal denture surface.

2. The method according to claim 1, wherein creating the shape of the abutment hole larger than the digital abutment representation comprises creating the shape of the abutment hole at least partly on an enlarged shape of the digital abutment representation.

3. The method according to claim 1, wherein the step of obtaining a digital first jaw model further comprises:
obtaining a surface scan of the expected implant site,
obtaining a radiographic image of the expected implant site, and
arranging the surface scan and the radiographic image in a common coordinate system.

4. The method according to claim 1, wherein the method further comprises that the digital abutment representation is a digital abutment model.

5. The method according to claim 4, wherein the method further comprises:
selecting the digital abutment model from a digital abutment model library.

6. The method according to claim 4, wherein the method further comprises:
providing a digital implant model,
arranging the digital implant model at the expected implant site, and
arranging the digital abutment model with the digital implant model.

7. The method according to claim 1, wherein the step of creating the digital prosthesis design comprises:
designing a support structure on the digital prosthesis design, wherein the support structure is designed to contact at least a part of the surface representation of the first jaw.

8. A method according to claim 7, wherein the step of designing the support structure comprises:
extending the support structure proximally from the digital prosthesis design.

9. The method according to claim 1, wherein the step of creating the digital prosthesis design comprises:
creating a digital gingiva model of the denture, and
creating at least one tooth model of the denture extending distally from the digital gingiva model.

10. A method according to claim 1, wherein the step of creating the shape of the abutment hole comprises:
offsetting the digital abutment representation outwards.

11. A method according to claim 1, wherein the step of creating the shape of the abutment hole comprises:
removing undercuts comprising reducing the digital prosthesis design, wherein an overlap between the digital prosthesis design and the digital abutment representation is removed when relatively shifting the prosthesis design and the surface representation of at least a part of the first jaw along a desired insertion direction between a position where the digital abutment representation is outside the abutment hole and a position where at least a part of the prosthesis surface and the surface representation of at least a part of the first jaw align with each other.

12. A method according to claim 1, wherein creating a digital prosthesis design of a denture comprises:
   creating a digital prosthesis design of the denture,
   creating a digital guide design of the positioning guide,
   manufacturing the denture based on the digital prosthesis design using a 3D manufacturing process, and
   manufacturing the positioning guide based on the digital guide design using a 3D manufacturing process.

13. The method according to claim 12, wherein the 3D manufacturing process is 3D printing.

14. The method according to claim 12, wherein the 3D manufacturing process is 3D milling.

* * * * *